No. 800,207. PATENTED SEPT. 26, 1905.
T. HADDEN.
LEVEL.
APPLICATION FILED MAR. 23, 1905.

Witnesses
Thomas Hadden
Inventor
By
Attorney

UNITED STATES PATENT OFFICE.

THOMAS HADDEN, OF FERGUSON, KENTUCKY.

LEVEL.

No. 800,207.  Specification of Letters Patent.  Patented Sept. 26, 1905.

Application filed March 23, 1905. Serial No. 251,682.

*To all whom it may concern:*

Be it known that I, THOMAS HADDEN, a citizen of the United States, residing at Ferguson, in the county of Logan and State of Kentucky, have invented certain new and useful Improvements in Levels, of which the following is a specification.

My invention relates to improvements in levels; and one object of my invention is the provision of a level which can be used to ascertain the level on work in various positions according to circumstances.

Another object of my invention is the provision of a level which can be used in various positions to ascertain the proper level and which can be adjusted with ease to insure absolute certainty and accuracy.

Another object of my invention is the provision of a level which will perform its functions in a perfect manner and which will be of inexpensive and durable construction.

With these objects in view my invention consists of a level embodying novel features of construction and combination of parts substantially as disclosed herein.

Figure 1:
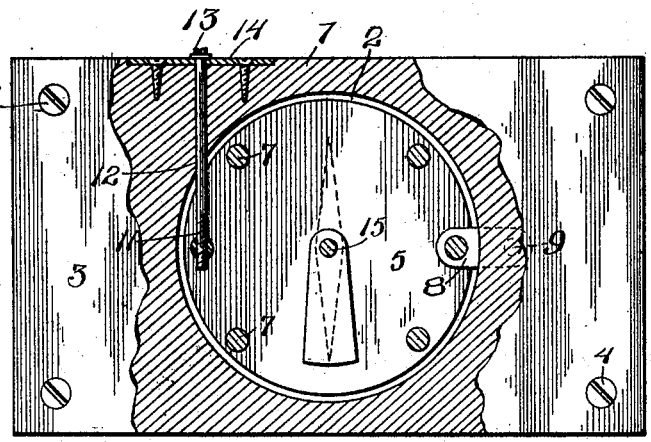
Figure 2:
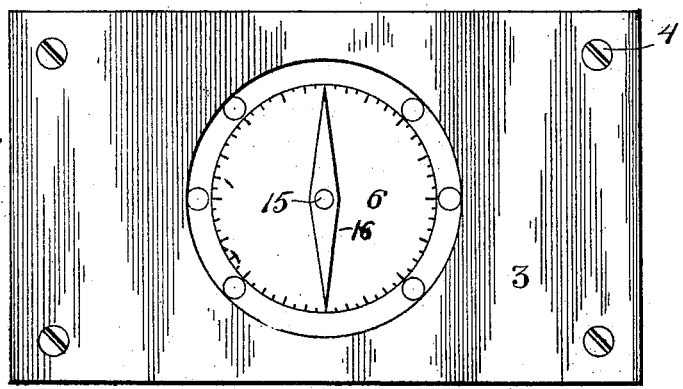
Figure 3:
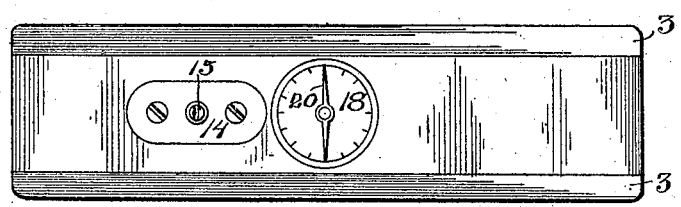
Figure 4:
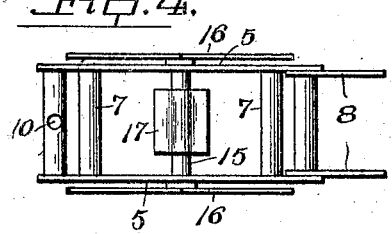
Figure 5:
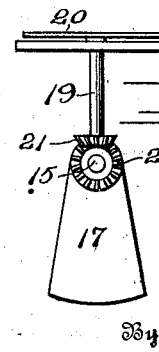

Figure 1 is a side elevation of my level, partly in section, to show the mechanism. Fig. 2 is a side view of the level. Fig. 3 is a top plan view. Fig. 4 is a bottom plan view of the mechanism removed, and Fig. 5 is a side view of the upper or top dial and operating mechanism.

In the drawings the numeral 1 designates the level proper having the central opening 2, in which the mechanism fits, and also having the side or face strips 3, secured to the level or body portion by means of screws 4, and the face-strips have openings also.

Fitting in the opening of the level is the pair of circular plates 5, having on each outer face a suitable scale or dial 6, and these plates are connected and rigidly secured together by the pins or studs 7, and to one of said studs on one side of the plates are secured the lugs 8, which fit in the walls of the level and are secured at 9. The pin or stud opposite the stud to which the lugs are secured is provided with a threaded opening 10, in which engages the lower threaded end 11 of the vertical adjusting-screw 12, whose upper portion is formed with a slotted head 13, which rests on the plate 14. From this construction it will be seen that the dials are secured in the level and that they may be readily adjusted with reference to the level proper to insure absolute accuracy under all conditions.

In the dials is mounted the central shaft 15, to each end of which is secured the finger or pointer 16, and depending from the shaft is the weight 17, which insures the pointer always indicating properly on the dials.

In the form of my level shown in Figs. 3 and 5 in addition to the side dials I employ a top dial 18, fitted in an opening in the upper edge of the level, and in the center of the dial fits the upper end of the vertical shaft 19, carrying the finger or pointer 20, and on the lower end of the vertical shaft is a bevel-gear 21, meshing with a bevel-gear 22 on the central shaft 15, carrying the weight 17. By this combination the level will designate on the top and sides, adapting the level for various kinds of work.

It is evident that I provide a level which is of the simplest and cheapest possible construction, which can be used in any situation and insure absolute accuracy, which is small and compact and easy to use and handle, which can be adjusted to keep the mechanism always true, and which is entirely practical in every respect.

I claim—

1. A level-stock having the opening, the pair of dials mounted in said opening, the lugs connecting the dials on one side to the level-stock, and the rod adjustably connecting the dials on the opposite side to the level-stock.

2. A level-stock having the opening, the pair of dials fitting in said opening, the transverse shaft mounted in the dials, the pointers on the outer ends of said shaft, the weight secured to said shaft, the lugs connecting the dials on one side to the level-stock and the adjusting-rod connecting the dials at the opposite side to the level-stock.

3. A level-stock provided with the opening, the pair of dials fitting in said opening, the transverse studs connecting the dials, the adjusting-rod engaging one of the studs and the lugs engaging the opposite stud and secured to the level-stock.

4. A level-stock having the opening, the dials fitting in said opening, the shaft carrying the pointers, the weight on said shaft, the bevel-gear on the shaft, the vertical shaft carrying the gear at its lower end and the pointer at its upper end, the dial, and the lugs and adjusting-rod for securing the mechanism in the level-stock.

In testimony whereof I affix my signature in presence of two witnesses.

THOMAS HADDEN.

Witnesses:
  WM. N. MOORE,
  HAZEL NORDEMAN.